(12) United States Patent
Ozawa et al.

(10) Patent No.: US 7,550,072 B2
(45) Date of Patent: Jun. 23, 2009

(54) METHOD OF PRODUCING ELECTROLYTIC HYDROGEN USING RARE ELEMENT-DEPOSIT ELECTRODE

(75) Inventors: Masaki Ozawa, Higashi-Ibaraki-gun (JP); Tetsuo Ikegami, Higashi-Ibaraki-gun (JP)

(73) Assignee: Japan Nuclear Cycle Development Institute, Ibaraki-Ken (JP)

( * ) Notice: Subject to any disclaimer, the term of this patent is extended or adjusted under 35 U.S.C. 154(b) by 978 days.

(21) Appl. No.: 10/910,325

(22) Filed: Aug. 4, 2004

(65) Prior Publication Data

US 2005/0115841 A1 Jun. 2, 2005

(30) Foreign Application Priority Data

Nov. 28, 2003 (JP) ............................. 2003-400038

(51) Int. Cl.
    *C25B 1/02* (2006.01)
(52) U.S. Cl. ........................................ 205/639
(58) Field of Classification Search ............... 205/255, 205/262, 640, 638, 639; 204/290.06; 423/22; 376/324; 134/1
    See application file for complete search history.

(56) References Cited

U.S. PATENT DOCUMENTS

| | | | | |
|---|---|---|---|---|
| 5,900,127 | A * | 5/1999 | Iida et al. | 204/290.08 |
| 6,793,799 | B2 * | 9/2004 | Ozawa et al. | 205/559 |
| 2003/0098232 | A1 * | 5/2003 | Roe et al. | 204/242 |
| 2003/0099322 | A1 * | 5/2003 | Ozawa et al. | 376/324 |

FOREIGN PATENT DOCUMENTS

JP 2003-161798 6/2003

OTHER PUBLICATIONS

D.W. Kirk, S.J. Thorpe and H. Suzuki (Kirk et al.), Ni-Base Amorphous Alloys As Electrocatalysts For Alkaline Water Electrolysis, May 30, 1997, Int. J. Hydrogen Energy, vol. 22, No. 5, pp. 493-500.*
Kouiti Izumiya et al., "Electrolytic Hydrogen Generation Tests By Rare Metal FP-Deposit Electrodes" 2003 Fall Meeting of the Atomic Energy Society of Japan (Sep. 24-26, 2003, at Shizuoka University) Preliminary Report (published: Aug. 7, 2003) with English translation.

* cited by examiner

*Primary Examiner*—Roy King
*Assistant Examiner*—Jessee R. Roe
(74) *Attorney, Agent, or Firm*—Wenderoth, Lind & Ponack, LLP.

(57) ABSTRACT

A nitric acid solution containing ions of any one element selected from the group consisting of rare element FP of Ru, Rh and Pd and a rare element of Re is electrolytically reduced by electrolyzing at a constant current to thereby deposit the ions of the element on an electrode. Alternatively, a nitric acid solution containing ions of two or more elements selected from the group consisting of rare element FP of Ru, Rh and Pd and a rare element of Re is electrolytically reduced by electrolyzing at a constant current to thereby collectively deposit the ions of the elements on an electrode. Alkaline water is electrolyzed by using the thus obtained electrodeposit electrode directly as it is as a catalytic electrode to efficiently generate hydrogen. Thus, a clean and sustaining energy system integrating the nuclear energy with the fuel cell power generation is provided.

4 Claims, 1 Drawing Sheet

US 7,550,072 B2

METHOD OF PRODUCING ELECTROLYTIC HYDROGEN USING RARE ELEMENT-DEPOSIT ELECTRODE

FIELD OF THE INVENTION

The present invention relates to an electrolytic hydrogen production method which can effectively utilize, as a catalyst, rare element fission products (FP) contained in spent nuclear fuels such as ruthenium (Ru), rhodium (Rh) and palladium (Pd), and a rare element, rhenium (Re), which is not FP.

BACKGROUND OF THE INVENTION

In nitric acid solutions and radioactive process liquid wastes generated from reprocessing plants for spent nuclear fuels used in light water reactors and fast reactors, useful FP of rare elements such as platinum group elements of Ru, Rh and Pd are contained. Such rare element FP are high in catalytic activity, and demand for such rare element FP is expected to be increased as electrode materials for fuel cells and as catalysts for producing and purifying fuel hydrogen.

As a technique for separating and recovering such rare element FP from nitric acid solutions containing rare element FP generated from a reprocessing step of spent nuclear fuels used in nuclear power generation facilities including light water reactors and fast reactors, there is a method proposed by the present assignee and described in Japanese Patent Laid-open Specification No. 2003-161798.

In this method, a nitric acid solution containing rare element FP generated from a reprocessing step of spent nuclear fuels is subjected to electrolytic reduction by a constant current electrolysis with $Pd^{2+}$ or $Fe^{2+}$ as a catalyst to thereby collectively electrodeposit the rare element FP on an electrode, and the deposits on the electrode are then collectively dissolved by electrolytic oxidation. Thereafter, the solution containing dissolved deposits therein is subjected to electrolytic reduction at a low current density, a medium current density and a high current density, succesively, whereby Ag/Pd group, Se/Te group and Ru/Rh/Tc group are separately deposited and recovered, group by group.

On the other hand, as a method for producing hydrogen to be fuel for the fuel cell power generation which is attracting attention as an energy conversion system clean and excellent in preventing environmental pollution, a reforming method by oxidation of hydrocarbon fuel and a method of electrolyzing alkaline water are widely employed. It is well known that, in both of these methods, the platinum group catalysts are extremely effective.

Although the above-described Japanese Patent Laid-open Specification No. 2003-161798 discloses a concept that the platinum group elements of Ru, Rh and Pd, namely, the rare element FP separated and recovered by using a constant current electrolysis can be effectively utilized as the electrode materials or catalysts for producing and purifying fuel hydrogen for fuel cells, there is taught no specific embodiment for effectively utilizing these FP. Additionally, when the rare element FP thus separated and recovered are intended to be utilized for various applications, it is necessary to adjust the components and to reprocess the forms of the recovered substances in conformity with the intended purposes.

Further, in the hydrogen production method using electrolysis of alkaline water, the stabilization of the supply and cost of the platinum group elements-based catalysts utilized as a catalytic electrode has been an important issue, in order to meet the demand, expected to increase rapidly in the future, for fuel hydrogen for use in the fuel cell power generation.

SUMMARY OF THE INVENTION

An object of the present invention is, therefore, to provide a clean and sustaining energy system integrating the nuclear energy with the fuel cell power generation by utilizing electrodeposits of platinum group elements of Ru, Rh and Pd which are rare element FP contained in spent nuclear fuels, and a rare element of Re, as a catalytic electrode for hydrogen production using a method of electrolyzing alkaline water.

The present inventors have accomplished the present invention on the basis of their finding that an electrodeposit electrode obtained by electrodepositing ions of rare element FP on an electrode through electrolytic reduction by constant current electrolysis of a nitric acid solution containing Ru, Rh and Pd which are rare element FP in a spent nuclear fuel, can be directly used as it is, without need of adjustment of the components and reprocessing of the forms of the deposits on the electrode, as a catalytic electrode for generating hydrogen using electrolysis of alkaline water, and hydrogen can be effectively produced by using such a catalytic electrode.

Additionally, the present inventors have found that, also for a nitric acid solution containing a rare element of Re, an electrodeposit electrode obtained by similarly electrodepositing Re ions on an electrode through constant current electrolysis can be effectively used as a catalytic electrode for use in electrolysis of alkaline water.

According to the present invention, there is provided a method of electrolytic hydrogen production using a rare element-deposit electrode, the method comprising electrolytically reducing a nitric acid solution containing ions of any one element selected from the group consisting of rare element FP of Ru, Rh and Pd and a rare element of Re by electrolyzing at a constant current to thereby deposit the ions of the element on an electrode, and electrolyzing alkaline water by using the obtained electrodeposit electrode as a catalytic electrode to thereby generate hydrogen.

Furthermore, according to another embodiment of the present invention, there is provided a method of electrolytic hydrogen production using a rare element-deposit electrode, said method comprising electrolytically reducing a nitric acid solution containing ions of two or more elements selected from the group consisting of rare element FP of Ru, Rh and Pd and a rare element of Re by electrolyzing at a constant current to thereby collectively deposit the ions of the elements on an electrode, and electrolyzing alkaline water by using the obtained electrodeposit electrode as a catalytic electrode to thereby generate hydrogen.

As the nitric acid solution containing rare element FP of Ru, Rh and Pd, there can be preferably used a nitric acid solution generated from a reprocessing step of spent nuclear fuels used in nuclear power generation facilities including light water reactors or fast reactors.

According to the electrolytic hydrogen production method using a rare element electrodeposit electrode of the present invention, the following advantageous effects can be achieved.

(1) When a nitric acid solution containing rare element FP obtained in a reprocessing step of spent nuclear fuels is subjected to electrolysis at a constant current, a catalytic electrode obtained by electrodepositing the rare element FP of Ru, Rh and Pd on a cathode can be directly utilized as it is as a catalytic electrode for electrolyzing alkaline water. Consequently, in comparison with the case where conventional methods for separating rare element FP, such as an ion exchange method and the like, are used, the step for producing a catalyst and the step for adjusting the components thereof come to be unnecessary, and thereby the simplification of the steps for producing the catalyst can be achieved.

(2) Similarly to the rare element FP, a catalytic electrode can be obtained by electrodepositing Re on a cathode through constant current electrolysis of a nitric acid solution containing Re, and the resulting catalytic electrode can be effectively used for electrolytic production of hydrogen.

(3) Both the production of a catalytic electrode in which Ru, Rh, Pd and Re are electrodeposited and the electrolytic production of hydrogen can be conducted by a unit operation involving electrochemical steps. Therefore, the whole steps can be simplified consistently, so that it comes to be possible to hold down the costs for design and construction of a plant and the cost for producing hydrogen. Additionally, because merely electrochemical steps are involved, organic solvents need not be used in principle, so that the safety of the processes can be maintained at a high level, and the secondary waste generation amount can be made extremely small.

(4) The catalytic electrode in which Ru, Rh, Pd and Re are electrodeposited exhibits a catalytic activity comparable with or better than those of the nickel (Ni) and titanium (Ti) electrodes conventionally used for electrolytic production of hydrogen, and exhibits a catalytic activity comparable to that of platinum (Pt) which is most excellent in catalytic activity among all the catalysts. Consequently, the catalytic electrode concerned can largely improve the economical efficiency of the electrolytic hydrogen production process as an alternative catalyst for Ni, Ti and Pt.

PREFERRED EMBODIMENTS OF THE INVENTION

Figure 1:
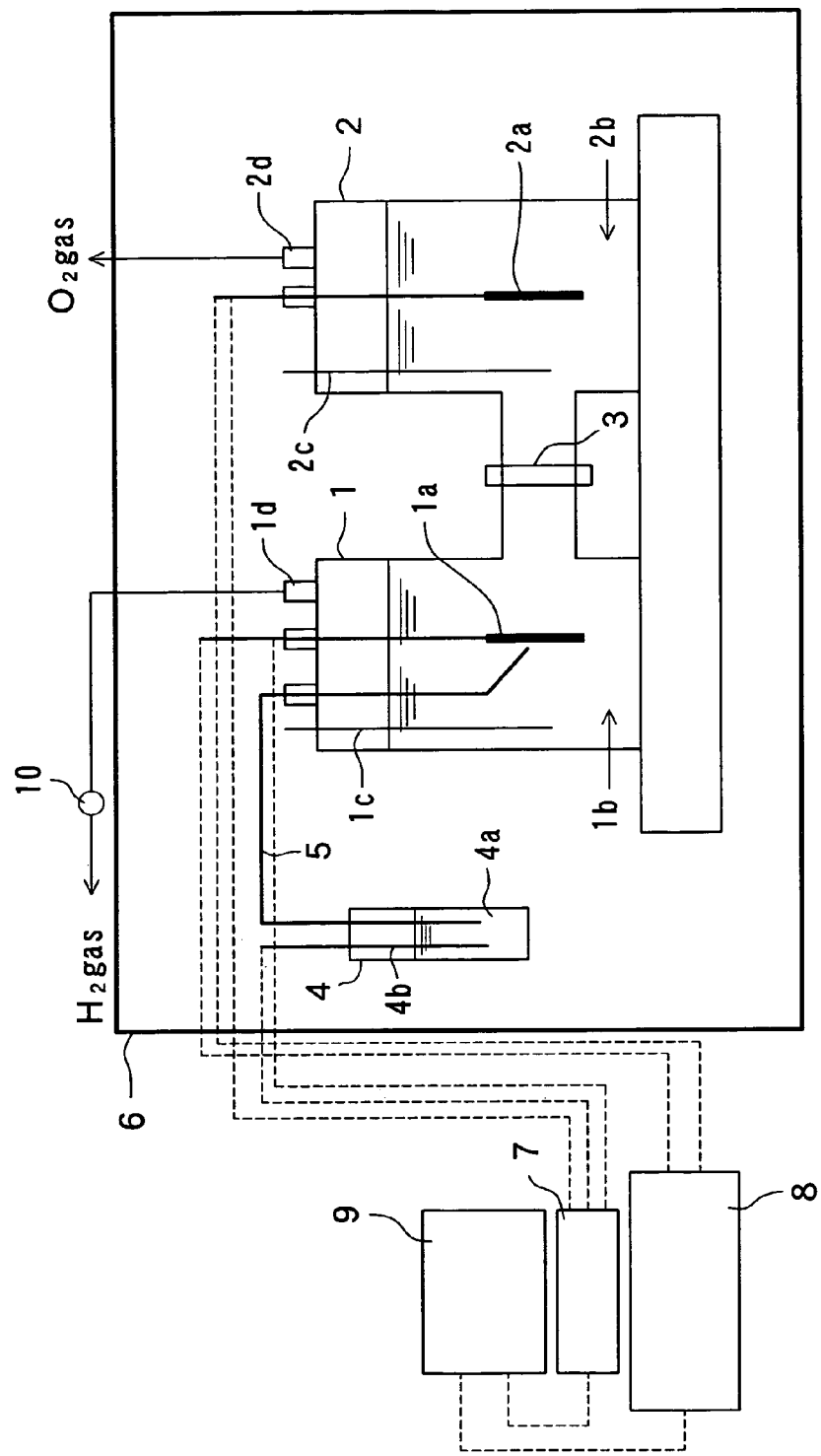
FIG. 1 is an illustrative diagram showing an example of an electrolysis apparatus used for the experiments for embodying the method of the present invention.

FIG. 1 illustrates an example of an electrolysis apparatus used for the experiments for embodying the method of the present invention, and such an apparatus can be used both for producing a catalytic electrode and for producing hydrogen. The electrolysis apparatus shown in FIG. 1 includes a cathode chamber 1 into which a cathode 1a is inserted and an anode chamber 2 into which an anode 2a is inserted, and these chambers are separated by a diaphragm 3. For the purpose of measuring the electrode potential, a salt bridge 5 made of a glass tube is inserted into the cathode chamber 1 from a beaker 4 filled with a saturated KCl solution 4a and a reference electrode 4b is inserted into the saturated KCl solution 4a. The cathode chamber 1, the anode chamber 2, the beaker 4 and the salt bridge 5 are housed in a thermostatic chamber 6 and are maintained at a constant temperature. The cathode 1a, the anode 2a and the reference electrode 4b are electrically connected to a potentiostat 7, respectively. Further, the cathode 1a and the anode 2a are electrically connected to a direct current power supply 8, respectively. The values on the potentiostat 7 and the direct current power supply 8 are electrically processed and recorded on a data logger 9. Into the cathode chamber 1 and the anode chamber 2, there are also inserted temperature sensors 1c and 2c for measuring the temperatures of the electrolytes 1b and 2b, respectively, contained in these chambers. The hydrogen gas generated in the cathode chamber 1 is discharged from a discharge opening 1d and recovered through a flowmeter 10, and the oxygen gas generated in the anode chamber 2 is discharged from a discharge opening 2d.

As the materials for the electrolysis chambers 1 and 2 and electrodes 1a and 2a, materials conventionally used hitherto can be used, as far as the materials have corrosion resistance to nitric acid solutions and alkaline water. For example, as the materials for the electrolysis chambers, metals, glass, plastics (PTFE and the like) and the like can be used; and as the electrode materials, stainless steel, platinum, platinum plated or coated titanium, graphite and the like can be used. Further, as the materials for the diaphragm 3, an ion exchange membrane of perfluorosulfonic acid type, porous glass, ceramics and the like can be used. Furthermore, when, as the nitric acid solution, a nitric acid solution containing the rare element FP generated from a reprocessing step for spent nuclear fuels is subjected to electrolysis treatment, materials having radiation resistance are used as the materials for the electrolysis chambers and electrodes.

When a nitric acid solution containing ions of Ru, Rh, Pd and Re is electrolyzed by using such an electrolysis apparatus, and a catalytic electrode is thereby produced by electrodepositing the ions of the respective elements, a nitric acid solution containing the ions of one or more elements is filled as electrolytes 1b and 2b in the cathode chamber 1 and the anode chamber 2, respectively, and electrolysis is conducted at a constant current under the electrolysis conditions in conformity with the deposition characteristics of the ions of the respective elements. As the materials for the cathode 1a which is to be a catalytic electrode by electrodepositing thereon the ions of the respective elements, there is no particular limitation to the materials, as far as the materials are insoluble or scarcely soluble in nitric acid solutions, and have appropriate electrodeposition properties for the ions of the respective elements; the materials can be appropriately selected from the above described various electrode materials. Additionally, as the shape of the cathode 1a, from a consideration on the presumption that the obtained catalytic electrode is used for producing hydrogen by electrolysis of alkaline water, it is preferable that the cathode is made to have a shape formed of expanded metal or the like for the purpose of ensuring outgassing.

When hydrogen is produced by electrolyzing alkaline water using the catalytic electrode obtained above, the catalytic electrode is used as the cathode 1a of the electrolysis apparatus, and an alkaline aqueous solution, such as sodium hydroxide, potassium hydroxide or the like, is filled in the cathode chamber 1 and the anode chamber 2 as the electrolytes 1b and 2b, respectively. Electrolysis at a constant current is then carried out under the conventional alkaline water electrolysis conditions, and hydrogen gas generated from the cathode chamber 1 is recovered. On the other hand, from the anode chamber 2, oxygen gas generated by the electrolysis of water is discharged. The oxygen gas may be recovered and utilized, if necessary.

When, as a nitric acid solution containing the rare element FP such as Ru, Rh and Pd, a nitric acid solution generated from reprocessing steps of the spent nuclear fuels in light water reactors and fast reactors is used, it is preferable, from the viewpoint of the measures for ensuring the radiation resistance, that these rare element FP separated and recovered from the nitric acid solution containing these rare element FP by electrodeposition using constant current electrolysis are subjected to appropriate treatments in conformity with radiochemical properties of the respective rare element FP, and thereafter the catalytic electrode of the present invention is produced. As the radiochemical treatment method, there can be cited a short period cooling (the specific radiotoxicities of short-lived FP of Ru and Rh are reduced by the cooling over a period of several ten years to such levels that the effects of the radiotoxicities are negligible), or a mild shielding (Pd is a long-lived FP, but is extremely low in specific radiotoxicity, so that a mild containment is applied, if necessary). In the case of the catalytic electrode in which plural rare elements are deposited in mixed-state, it is preferable that the cooling treatment and the mild shielding treatment are combined.

On the other hand, Re that is not FP but is a rare element is an element found in the natural world in extremely small quantities, and is contained in molybdenum ores and platinum ores in trace amounts; among them molybdenite is the most important source of Re. Additionally, Re is known to occur as a pneumatolytic mineral or rhenium sulfide $ReS_2$ in volcanic craters. However, in many cases, Re is usually obtained as byproducts from ores of molybdenum, copper, lead and the like. Re is commercially available as a powder of approximately 99.5% purity, or as a compound, $KReO_4$. The conventional applications of Re include, for example, materials for high vacuum electronic tubes based on the strong thermoelectron emission characteristic thereof, filament materials, super heat resistant alloys, a high temperature thermocouple (W-Re), a catalyst for hydrogenation reaction or dehydrogenation reaction, and the like.

Cathode chamber, anode chamber: Heat resistant glass

Diaphragm: Ion exchange membrane (product name "Du Pont 117 Nafion® membrane", manufactured by Du Pont Co., Inc.)

Cathode: Thin Ti plate (electrode surface: 25 mm long×25 mm wide×0.12 mm thick)

Anode: Pt gauze (100 $cm^2$)

Reference electrode: Ag/AgCl electrode

TABLE 1

|  |  | Pd solution | Re solution | Rh solution | Ru solution | Re + Ru solution | Pd + Rh solution | Re + Ru + Pd + Rh solution (a) | Re + Ru + Pd + Rh solution (b) | Re + Ru + Pd + Rh solution (c) | Re + Ru + Pd + Rh solution (d) |
|---|---|---|---|---|---|---|---|---|---|---|---|
| Rare element conc. | (mgPd/L solution) | 250 |  |  |  |  | 120 | 80 | 40 | 27 | 27 |
|  | (mgRh/L solution) |  |  | 350 |  |  | 180 | 140 | 70 | 47 | 47 |
|  | (mgRe/L solution) |  | 500 |  |  | 240 |  | 180 | 90 | 60 | 60 |
|  | (mgRu/L solution) |  |  |  | 1000 | 120 |  | 80 | 40 | 27 | 27 |
| Nitric acid conc. (normal conc., N) |  | 1 | 0.5 | 0.5 | 0.5 | 0.5 | 0.5 | 0.5 | 0.5 | 0.5 | 0.5 |
| Electrolysis temperature (° C.) |  | 50 | 50 | 50 | 50 | 50 | 50 | 50 | 50 | 50 | 50 |
| Cathode electrode (material, etc.) |  | Ti substrate | Ti substrate | Ti substrate | Ti substrate | Ti substrate | Ti substrate | Ti substrate | Ti substrate | Ti substrate | Sintered Ti |
| Cathode electrode area ($cm^2$) |  | 12.50 | 12.44 | 12.38 | 12.48 | 12.50 | 12.50 | 12.50 | 12.50 | 12.50 | 12.50 |
| Anode electrode (material. etc.) |  | Pt gauze | Pt gauze | Pt gauze | Pt gauze | Pt gauze | Pt gauze | Pt gauze | Pt gauze | Pt gauze | Pt gauze |
| Electrolysis time (min) |  | 30 | 180 | 240 | 180 | >180 | 120 | 126 | 108 | 85 | 120 |
| Cathode current density (mA/$cm^2$) |  | 48 | 241 | 137 | 98 | 100 | 96 | 102 | 100 | 97 | 97 |

TEST EXAMPLE 1

Production of a Catalytic Electrode

By using the electrolysis apparatus shown in FIG. 1, a nitric acid solution containing ions of one or more elements Ru, Rh, Pd and Re was filled as an electrolyte in the cathode chamber and the anode chamber, constant current electrolysis was conducted under the electrolysis conditions shown in Table 1, and the ions of the respective elements were electrodeposited on the cathode to produce a catalytic electrode. The termination point of the deposition was presumed from changes of the cathode potential. The materials of the electrolysis chambers and electrodes, and the like are as follows:

TEST EXAMPLE 2

Production of Hydrogen by Electrolyzing Alkaline Water

The ten types of catalytic electrodes obtained in Test Example 1 were used as the cathode in the electrolysis apparatus shown in FIG. 1, and 1 M sodium hydroxide aqueous solution was used as the electrolyte filled in the cathode chamber and the anode chamber. Constant current electrolysis was conducted under the conditions such that the operation temperature was 50° C. and the cathode current density took the values of 50, 100 and 150 mA/$cm^2$, and the cathode potential, the inter-terminal voltage between the cathode and the anode and the like were measured. The amount of generated hydrogen gas was measured by means of a soap film flowmeter, the current efficiency for hydrogen generation was derived, and the electric power consumption rate was derived from this current efficiency.

Prior to hydrogen production, the potential of the catalytic electrode was swept at 50 mV/sec between plus and minus in 1 M sodium hydroxide aqueous solution, and thus a cyclic voltammogram (potential-current curve) was obtained. From the obtained redox current of the electrode surface, the apparent hydrogen generation potential was obtained.

The catalyst amount and the catalyst composition of the catalytic electrode were analyzed by means of a scanning electron microscope, an X-ray microanalyzer, and the electron spectroscopy for chemical analysis.

The results thus obtained are collectively shown in Table 2.

As the cathode for use in comparison of the effect of the catalytic electrode, the same thin Ti plate as that used in Test Example 1, a thin Ni plate the same in shape as this thin Ti plate, a bundle of Pt wires formed by bundling Pt wires (0.2 mmϕ) so as for the surface area of the wires to be the same as the areas of these plates were used to obtain the data, and the data thus obtained are also shown in Table 2 as Comparative Example 1, Comparative Example 2 and Comparative Example 3, respectively.

improving effect of Re on the hydrogen production activity is extremely high. (As compared to Ti (Comparative Example 1), Re–Ti makes nobler by +0.4 V. As compared to Ru–Ti, Ru(7)+Re(3)–Ti makes nobler by +0.5 V.)

(4) The hydrogen generation potentials of the 4 type mixed deposit electrodes are extremely noble. (Pd+Rh+Ru+Re–Ti (a) exhibits −0.1 V.)

(5) The data of the cathode electric power consumption rate support the above descriptions (1), (2), (3) and (4).

TABLE 2

| | Catalyst amount per unit area (mg/cm$^2$) | Catalyst composition ratios (atom %) | Apparent hydrogen generation potential (*1) | Current efficiency for hydrogen generation ξ(%) (*2) | Electric power consumption rate W = U$_t$ · Q$_o$/ξ (*3) | | | | Cathode electric power consumption rate W = U$_c$ · Q$_o$/ξ (*4) |
|---|---|---|---|---|---|---|---|---|---|
| | | | | | U$_t$ | U$_t$/ξ | Ni electrode as reference | Pt electrode as reference | Ni electrode as reference |
| Ti (Comp. Ex. 1) | — | — | −1.6 | 98.9 | 12.3 | 12.4 | 1.07 | 1.28 | 1.14 |
| Ni (Comp. Ex. 2) | — | — | −1.2 | 99.1 | 11.5 | 11.6 | 1 | 1.2 | 1 |
| Pt wire bundle (Comp. Ex. 3) | — | — | −1.011 | 100 | 9.65 | 9.65 | 0.83 | 1 | 0.99 |
| Ru—Ti | 1.2 | Ru 100 | −1.1 | 98.9 | 9.24 | 9.34 | 0.81 | 0.97 | 0.93 |
| Rh—Ti | 2.9 | Rh 100 | −0.9 | 97 | 9.04 | 9.32 | 0.8 | 0.97 | 0.796 |
| Pd—Ti | 2.6 | Pd 100 | −0.9 | 98.9 | 8.5 | 8.59 | 0.74 | 0.89 | 1 |
| Re—Ti | (*5) | Re 100 | −1.2 | 99.1 | 10.2 | 10.3 | 0.89 | 1.07 | 1.05 |
| Ru(7) + Re(3) – Ti | 0.8 | Ru:Re = 69.9:30.1 | −0.6 | 99.1 | 9.96 | 10.1 | 0.87 | 1.05 | 0.8 |
| Pd(6) + Rh(4) – Ti | 1.8 | Pd:Rh = 60.3:38.4 | −0.9 | 97.2 | 9.69 | 9.97 | 0.86 | 1.03 | 0.81 |
| Pd + Rh + Ru + Re – Ti (a) | 0.5 | Pd:Rh:Ru:Re = 30.2:25.0:24.2:20.5 | −0.1 | 98.3 | 11 | 11.2 | 0.97 | 1.16 | 0.85 |
| Pd + Rh + Ru + Re – Ti (b) | 0.4 | Pd:Rh:Ru:Re = 20.6:25.6:21.8:32.0 | — | 99.1 | 9.59 | 9.68 | 0.83 | 1 | 0.79 |
| Pd + Rh + Ru + Re – Ti (c) | 0.5 | Pd:Rh:Ru:Re = 25.5:37.6:25.6:11.3 | — | 97.9 | 9.76 | 9.97 | 0.86 | 1.03 | 0.78 |
| Pd + Rh + Ru + Re – Ti (d) | 0.6 | — | — | 97.7 | 9.96 | 10.2 | 0.88 | 1.06 | 0.86 |

The notes (*1) to (*5) in Table 2 are as follows.
(*1): The unit for the apparent hydrogen generation potential is (V. vs Ag/AgCl, 1 M NaOH), and the potential was obtained by extrapolation from the cyclic voltammometry data.
(*2): The current efficiency for hydrogen generation ξ (%) is the value obtained in electrolysis at a current density of 100 mA/cm$^2$.
(*3): The electric power consumption rate is the energy efficiency for the whole water electrolysis system incorporating one of various catalytic electrodes as the cathode, and represents the electric energy required for producing the unit mass of the product. In the formula:
W: Electric power consumption rate
U$_t$: Chamber voltage
Q$_o$: Theoretical quantity of electricity
ξ: Current efficiency
(As for the formula of the electric power consumption rate, see "Denki Kagaku Binran (Handbook of Electrochemistry), 5th ed.," edited by The Electrochemical Society of Japan, published by Maruzen K. K., pp.369-371).
(*4): The cathode electric power consumption rate represents the electric power consumption rate obtained by subtracting the contribution of the anode polarization from the electric power consumption rate of the whole water electrolysis system. In the formula, U$_c$ represents a cathode voltage.
(*5): No observed data.

From the data in Table 2, the following facts are revealed. Incidentally, the apparent hydrogen generation potentials (hereinafter abbreviated as "hydrogen generation potential") in Table 2 qualitatively show that the nobler the potential is, the higher is the activity in the electrolytic generation reaction of hydrogen.

(1) The hydrogen generation potentials obtained with the electrode with Ru, Rh or Pd deposited each alone are nobler than those obtained with the Ti electrode (Comparative Example 1) and the Ni electrode (Comparative Example 2), and nearly identical with that obtained with the Pt electrode (Comparative Example 3).

(2) As for the mixed deposit electrodes, there is shown a tendency such that the hydrogen generation potential of the Re based mixed deposit electrode is nobler than those of the other electrodes. (Ru(7)+Re(3)–Ti exhibits −0.6 V; Pd+Rh+ Ru+Re–Ti(a) exhibits −0.1 V.)

(3) An extremely small amount of Re deposition makes the hydrogen generation potential nobler. Accordingly, the (6) Ru (RuNO$^{3+}$) and Re (ReO$^{4−}$) are hardly electrodeposited each alone, and the deposition amounts thereof are smaller as compared to the deposition amounts of Pd (Pd$^{2+}$) and Rh (Rh$^{3+}$). However, when these 4 types of elements are subjected to mixed deposition, the numbers of deposited atoms thereof are almost identical with each other. Consequently, it can be said that under the condition in which Pd and Rh coexist, Ru and Re are more easily deposited.

From the analysis of the data in Table 2, it can be seen that the hydrogen generation activity of the catalytic electrode of the present invention with Ru, Rh or Pd deposited each alone is better than those of the Ti electrode and the Ni electrode, nearly identical with that of the Pt electrode, and that Re is excellent in the improving effect of the hydrogen generation activity. Further, the hydrogen generation activity of the 4 type mixed deposition electrodes involving Ru, Rh, Pd and Re are extremely high, and can reduce the electric power consumption ratio for hydrogen generation by a maximum of about 20% as compared to the conventional Ni and Pt electrodes in terms of the cathode electric power consumption ratio.

As can be seen from the foregoing, by embodying the method of the present invention, it comes to be possible to effectively utilize Ru, Rh and Pd as the catalysts for use in hydrogen production based on electrolysis of alkaline water, although these elements are rare element FP which are conventionally vitrified and disposed together with other FP in the spent nuclear fuels.

On the assumption that there are 50 power generation facilities of 1,000,000 kW based on light water reactors in Japan, the annual productions of Ru, Rh and Pd as FP in the spent nuclear fuels are such that 3.4 tons for Ru, 0.6 ton for Rh and 2.1 tons for Pd. On the assumption that from a nitric acid solution dissolving 80% of these FP therein, the whole dissolved amounts can be recovered, 2.7 tons of Ru, 0.5 ton of Rh and 1.7 tons of Pd can be supplied. These supply amounts are respectively 130%, 19% and 1% of the demanded amounts of 2.1 tons of Ru, 2.7 tons of Rh and 48.5 tons of Pd at the time of 1988 in Japan. Thus, as for Ru and Rh, a great deal amount can be provided from the spent nuclear fuels.

Additionally, as for Pd, it has been reported that the estimated minable reserve is about 20,000 tons, while the annual production in 1998 is 200 tons. In the present century, in consideration of the rapid growth of fuel cell vehicles and fuel cell power generation systems and the demands in other fields, it is feared with an extremely large probability, that the Pd resources will be exhausted at the end of this century. In addition, it is highly anticipated that the price of Pd will rise and the resource-supplying countries will restrict the supply from a strategic standpoint. In such cases, the recovery of Pd and other rare element FP in spent nuclear fuels, though not large in quantity, comes to be of great significance in the issue of resources.

What is claimed is:

1. A method of electrolytic hydrogen production using a rare element-deposit electrode, said method comprising
    electrolytically reducing a nitric acid solution containing ions of any one element selected from the group consisting of Ru, Rh, Pd and Re by electrolyzing at a constant current to thereby deposit the ions of the element on an electrode, and
    electrolyzing alkaline water by using the obtained electrodeposit electrode directly as it is as a catalytic electrode to thereby generate hydrogen.

2. A method of electrolytic hydrogen production using a rare element-deposit electrode, said method comprising
    electrolytically reducing a nitric acid solution containing ions of two or more elements selected from the group consisting of Ru, Rh, Pd and Re by electrolyzing at a constant current to thereby collectively deposit the ions of the elements on an electrode, and
    electrolyzing alkaline water by using the obtained electrodeposit electrode directly as it is as a catalytic electrode to thereby generate hydrogen.

3. The method of electrolytic hydrogen production using a rare element-deposit electrode according to claim 1 or 2, wherein said nitric acid solution containing said ions is a nitric acid solution containing ions of a rare element FP of Ru, Rh or Pd generated from a reprocessing step of spent nuclear fuels used in nuclear power generation facilities including light water reactors or fast reactors.

4. The method of electrolytic hydrogen production using a rare element-deposit electrode according to claim 1 or 2, wherein said electrolytically reducing step of the nitric acid solution and said electrolyzing step of alkaline water are carried out using the same electrolysis apparatus.

* * * * *